US007400207B2

(12) United States Patent
Lipp et al.

(10) Patent No.: US 7,400,207 B2
(45) Date of Patent: Jul. 15, 2008

(54) ANODICALLY BONDED CELL, METHOD FOR MAKING SAME AND SYSTEMS INCORPORATING SAME

(75) Inventors: Steven Alan Lipp, West Windsor, NJ (US); Joseph H. Abeles, East Brunswick, NJ (US); Alan Michael Braun, Lawrenceville, NJ (US); Sterling Eduard McBride, Princeton, NJ (US); John P. Riganati, Skillman, NJ (US); Ralph Doud Whaley, Jr., Princeton Junction, NJ (US); Peter J. Zanzucchi, Princeton Junction, NJ (US)

(73) Assignee: Sarnoff Corporation, Princeton, NJ (US)

( * ) Notice: Subject to any disclaimer, the term of this patent is extended or adjusted under 35 U.S.C. 154(b) by 268 days.

(21) Appl. No.: 11/030,009

(22) Filed: Jan. 5, 2005

(65) Prior Publication Data

US 2005/0184815 A1 Aug. 25, 2005

Related U.S. Application Data

(60) Provisional application No. 60/534,420, filed on Jan. 6, 2004.

(51) Int. Cl.
*H01S 1/06* (2006.01)

(52) U.S. Cl. .......................................... 331/94.1; 331/3

(58) Field of Classification Search ..................... 331/3, 331/94.1
See application file for complete search history.

(56) References Cited

U.S. PATENT DOCUMENTS

| | | | | |
|---|---|---|---|---|
| 5,327,105 | A * | 7/1994 | Liberman et al. | 331/94.1 |
| 5,670,914 | A * | 9/1997 | Liberman et al. | 331/94.1 |
| 6,320,472 | B1 * | 11/2001 | Vanier | 331/94.1 |
| 6,570,459 | B1 * | 5/2003 | Nathanson et al. | 331/94.1 |
| 2004/0233003 | A1 | 11/2004 | Happer et al. | |
| 2005/0236460 | A1 * | 10/2005 | Abbink et al. | 228/101 |

* cited by examiner

*Primary Examiner*—Robert J. Pascal
*Assistant Examiner*—James E Goodley
(74) *Attorney, Agent, or Firm*—Lowenstein Sandler PC

(57) ABSTRACT

A cell suitable for use with an atomic clock and a method for making the same, the cell including: a silicon wafer having a recess formed therein; at least one amorphous silicate member having an ion mobility and temperature expansion coefficient approximately that of silicon sealing the recess; and, an alkali metal containing component and buffer gas contained in the recess. The method includes: providing a silicon wafer; forming a cavity through the silicon wafer; introducing an alkali metal containing component and buffer gas into the cavity; and, anodically bonding at least one amorphous silicate member having an ion mobility and temperature expansion coefficient approximately that of silicon to the wafer to close the cavity.

20 Claims, 10 Drawing Sheets

ANODICALLY BONDED CELL, METHOD FOR MAKING SAME AND SYSTEMS INCORPORATING SAME

RELATED APPLICATION

This application claims priority of U.S. patent application Ser. No. 60/534,420 filed Jan. 6, 2004, entitled ANODICALLY BONDED CELL FOR ATOMIC CLOCKS AND METHODS FOR FILLING, the entire disclosure of which is hereby incorporated by reference as if being set for in its entirety herein.

GOVERNMENT LICENSE RIGHTS

The invention was made with U.S. government support, and the U.S. Government has certain rights in the invention, as provided for by the terms of Contract number NBCHC020045 (DARPA) awarded by the U.S. Army Research Laboratory.

FIELD OF THE INVENTION

The present invention relates generally to atomic clocks and systems incorporating atomic clocks, and according to one aspect of the present invention to Chip-Scale Atomic Clocks (CSACs) and systems incorporating CSACs, as well as cells well suited for use in CSACs and methods for making the same.

BACKGROUND OF THE INVENTION

It is believed to be desirable to provide compact atomic clocks, such as Chip-Scale Atomic Clocks (CSACs). One method for providing such clocks uses an alkali metal atomic vapor (hereinafter "atomic vapor"), such as a Cs or Rb atom containing vapor. Accordingly, it is believed to be desirable to provide a method for fabricating compact atomic vapor containing cells. Such cells are believed to be useful in realizing compact atomic clocks, such as CSACs.

SUMMARY OF THE INVENTION

A cell suitable for use with an atomic clock including: a silicon wafer having a recess formed therein; an alkali metal containing component and buffer gas contained in the recess; and, at least one amorphous silicate member having an ion mobility and temperature expansion coefficient approximately that of silicon sealing the recess.

A process for fabricating a cell suitable for use with an atomic clock including: providing a silicon wafer; forming a cavity through the silicon wafer; introducing an alkali metal containing component and buffer gas into the cavity; and, anodically bonding at least one amorphous silicate member having an ion mobility and temperature expansion coefficient approximately that of silicon to the wafer to close the cavity.

BRIEF DESCRIPTION OF THE FIGURES

Understanding of the present invention will be facilitated by consideration of the following detailed description of the preferred embodiments of the present invention taken in conjunction with the accompanying drawings, wherein like numerals refer to like parts and.

DETAILED DESCRIPTION OF THE PREFERRED EMBODIMENTS OF THE INVENTION

It is to be understood that the figures and descriptions of the present invention have been simplified to illustrate elements that are relevant for a clear understanding of the present invention, while eliminating, for purposes of clarity, many other elements found in typical atomic clocks, atomic clock cells, systems incorporating clocks, and manufacture methods relating thereto. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to such elements and methods known to those skilled in the art.

Figure 1:
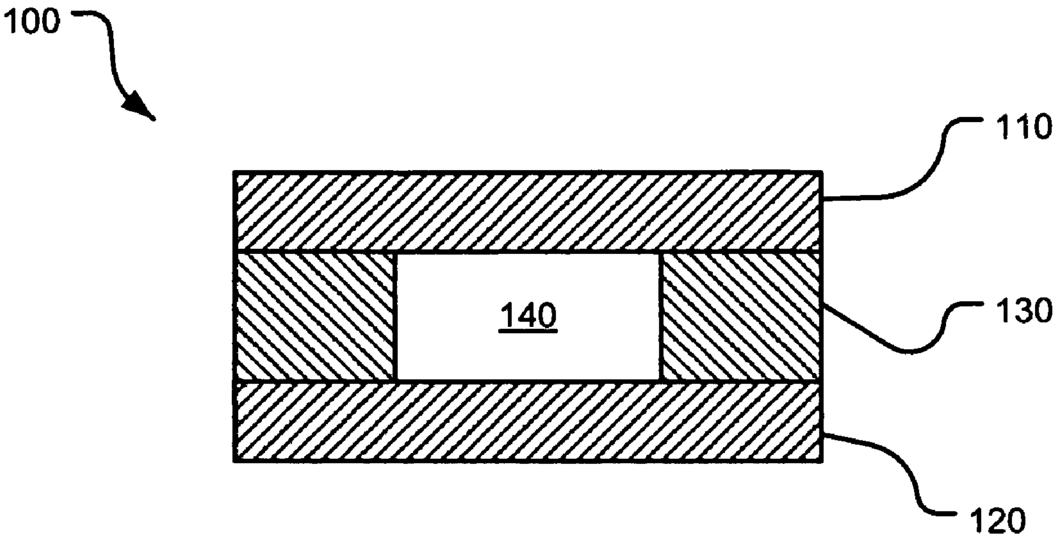
FIG. 1 illustrates a cell according to an aspect of the present invention.

Referring now to FIG. 1, there is shown a cavity structure, or cell, 100 according to an aspect of the present invention. Structure 100 generally includes layers 110, 120 and 130 forming closed cavity 140. By way of non-limiting example, layers 110, 120 may take the form of an amorphous silicate having an ion mobility and temperature expansion coefficient approximately that of silicon, such as a borosilicate glass like Pyrex, which is commercially available from DuPont, where layer 130 takes the form of single crystal silicon. Cavity 140 may contain an alkali metal atomic vapor, such as metallic cesium or other alkali metal, and a buffer gas, such as an inert buffer gas like argon or neon. The present invention will be discussed as it relates to Cs, however another alkali metal such as Rb may of course be used.

Cavity 140 may have an inner, lateral dimension on the order of about 100 micrometers to about 2 millimeter. Cavity 140 may have an internal volume on the order of around a nanoliter to about a microliter. The relatively small size of structure 100 may serve to reduce power consumption as compared to larger devices, as relatively small heaters may be used. Cavity 140 may have be a low pressure cell (having a pressure below about an atomosphere) or a high pressure cell (having an internal pressure up to about 10 atmospheres), for example.

By way of non-limiting example, cell 100 may be suitable for use with the method and system described in U.S. Patent Publication No. 2004/0233003A1, entitled METHOD AND SYSTEM FOR OPERATING AN ATOMIC CLOCK WITH REDUCED SPIN-EXCHANGE BROADENING OF ATOMIC CLOCK RESONANCES, by William Happer and Daniel Walter, the entire disclosure of which is hereby incorporated by reference as if being set forth in its entirety herein.

Figure 2:
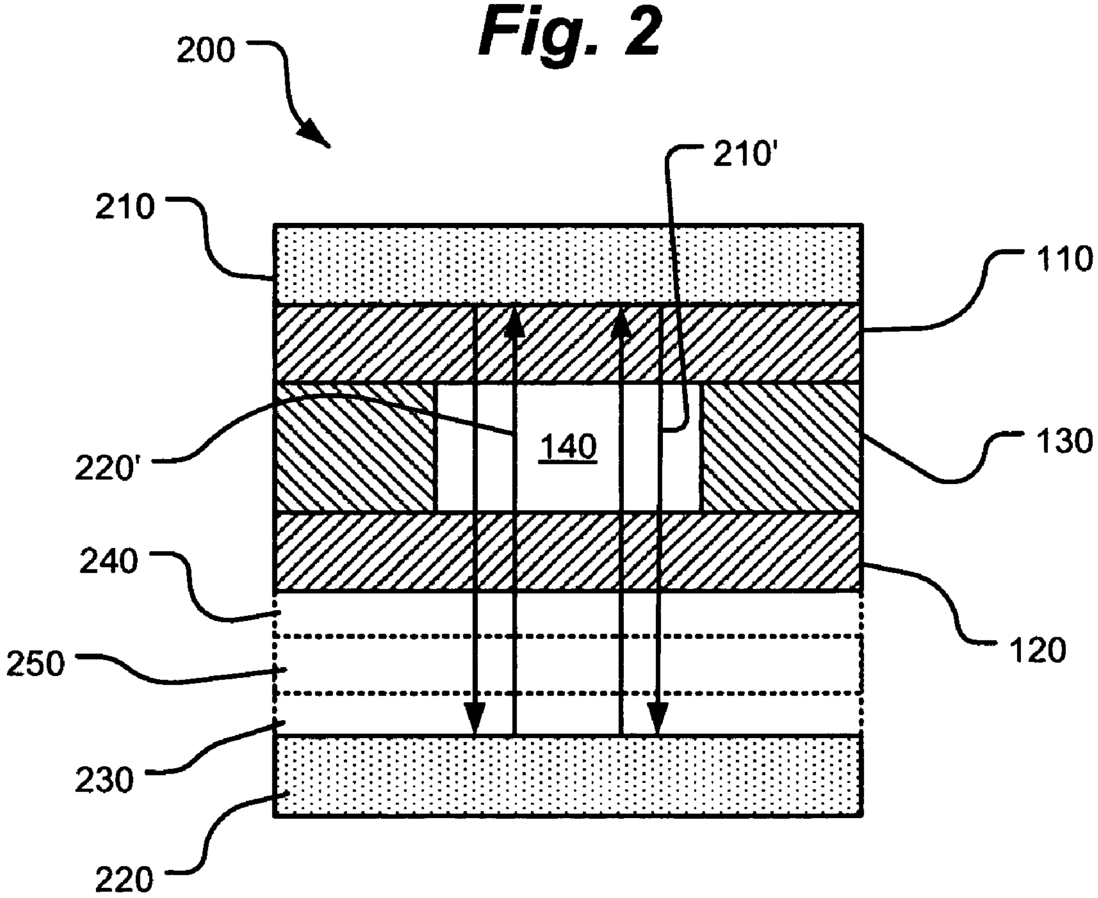
FIG. 2 illustrates a device incorporating the cell of FIG. 1 according to an aspect of the present invention.

Referring now also to FIG. 2, there is shown a non-limiting example of a system 200 incorporating structure 100 of FIG. 1. System 200 generally includes layers 110, 120 and 130 positioned between a reflecting system 210 and an emitting/detecting system 220. Reflecting system 210 may include a reflector, such as a mirror or chirped grating, suitable for use with signal(s) 220' emitted from system 220 through structure 100. System 220 may include an emitter, such as a vertical cavity surface emitting laser (VCSEL), and detector. The VCSEL may be suitable for emitting signal(s) 220', while the detector is suitable for detecting signals 210' reflected by system 210. Emitted signals may have a center wavelength around 894 nm, by way of non-limiting example only. Detector 220 may take the form of one or more amplitude detectors, such as one or more photodiodes, for example. System 200 may include additional elements, such as a neutral density filter 230 and/or ¼ waveplate 240 positioned between system 220 and structure 100. Alternatively, such a filter and/or waveplate may be incorporated into system 220 or the structure 100, for example. System 200 may include a semiconductor based amplitude modulator 250 positioned between source 220 and cavity 140. Modulator 250 may serve to amplitude modulate emissions 220' prior to their introduction to cavity 140.

Figure 3:
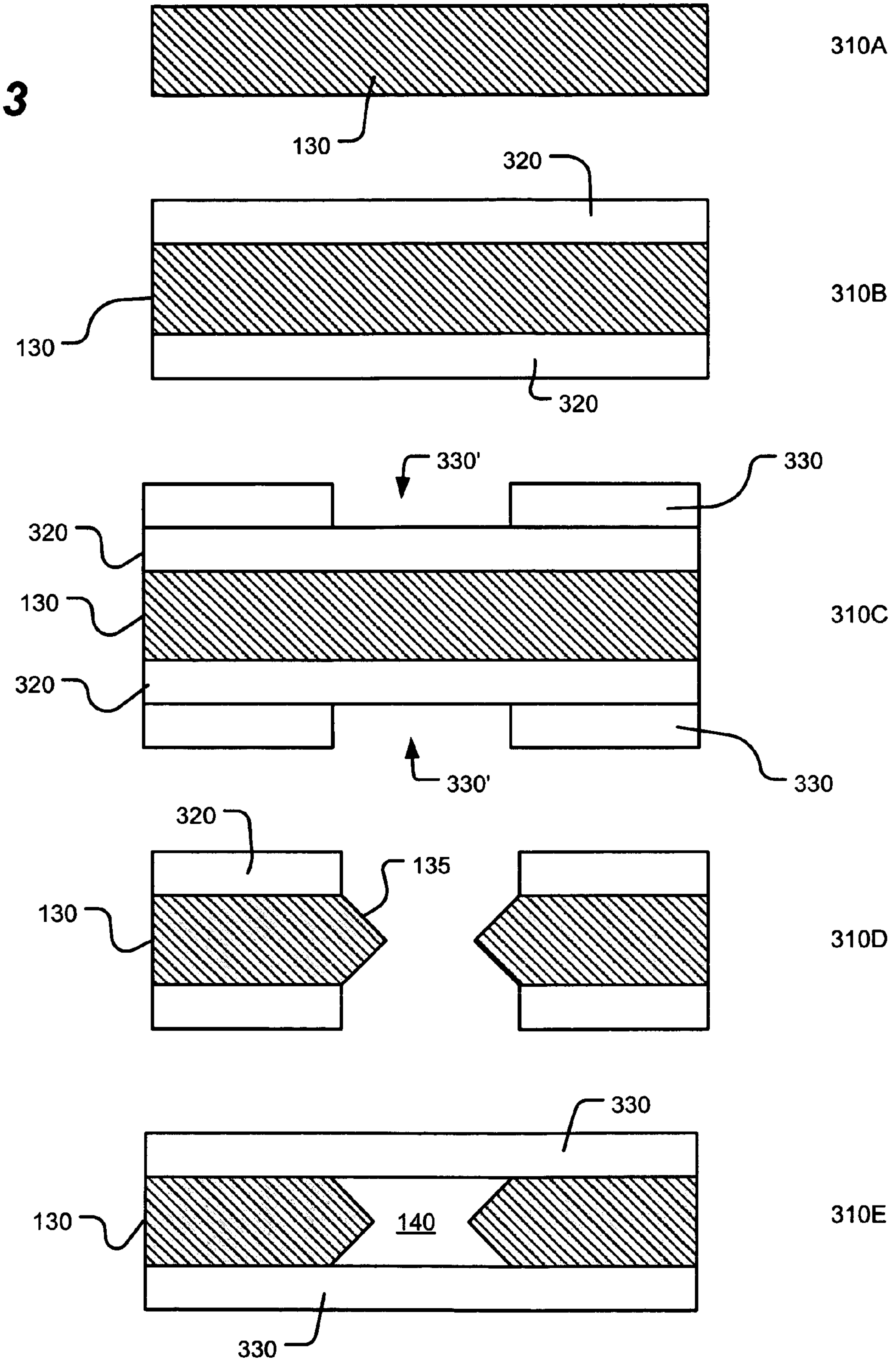
FIG. 3 illustrates a process for making a cell according to an aspect of the present invention.

Referring now also to FIG. 3, there are shown structures 310A-310E. Structures 310A-310E represent a single structure at various processing stages. Referring first to structure 310A, there is shown a layer 130. Layer 130 may take the form of a polished single crystal silicon wafer. The wafer may be about ½ to about 2 mm thick, depending upon the desired depth of cavity 140 (FIG. 1), for example. Referring now also to structure 310B, layers 320 may be provided on wafer 130. Each layer 320 may be composed of $Si_xN_y$, such as $Si_3N_4$, or an oxide for example. Each layer 320 may be up to about 10,000 angstroms thick, for example. Layers 320 may be plasma enhanced chemical vapor deposited upon wafer 130, for example. Layers 320 may serve as etch masks for wafer 130.

Referring now also to structure 310C, layers 330 may be provided over layers 320. Layers 330 may take the form of dry film photoresist, such as Riston, which is commercially available from DuPont. Layers 330 may be patterned using conventional photolithographic processing to provide opening(s) 330'. The size of each opening 330' may determine the eventual length and width of cavity 140 (FIG. 1). The shape of opening 330' may determine the eventual shape of cavity 140 (FIG. 1). The remaining portion(s) of layers 330 may then be used as an etch mask for layers 320. A conventional $CF_4$ plasma etch may be used to remove the unmasked portions of layers 320, for example.

Referring now also to structure 310D, the remaining portions of layers 320 may serve as an anisotropic etch mask for wafer 130. A caustic etch, such as one using a mixture of KOH, water and n-propanol may be used. As will be understood by those possessing an ordinary skill in the pertinent arts, such an etch is crystallographic plane selective such that the sidewalls 135 of cavity 140 are oriented at 57° to the surface plane. As will also be recognized by one possessing an ordinary skill in the pertinent arts, this may lead to a certain relation of cavity opening size at the surface of silicon wafer 130 to overall device width and length. Other techniques may optionally be used in lieu of, or in addition to, the caustic etch to provide for smaller overall devices for a given cavity opening by etching more vertical sidewalls. For example, a deep reactive ion etch (RIE), physical machining or eroding or plasma etch of silicon wafer 130 may provide for more vertical sidewalls, that in turn provides a smaller overall device size for a given cavity opening. Overall device size may approach 125% of cavity opening size, for example. Regardless, the remaining portions of layers 320 may be removed in a conventional manner, such as by using a buffered HF or phosphoric acid.

Referring now also to structure 310E, wafer 130 may then be anodically bonded to top and bottom plates 330. According to an aspect of the present invention, the plates may each be transparent to electromagnetic energy to be used in combination with cavity 140 (FIG. 1), e.g., around 894 nm, such as signals emitted from structure 220 (FIG. 2) and reflected by structure 210 (FIG. 2). Plates 330 may each take the form of an amorphous silicate having an ion mobility and temperature expansion coefficient approximately that of wafer 130, e.g., single crystal silicon. For example, each of the top and bottom plates 330 may take the form of a Pyrex 7740 glass sheet having a thickness between about 0.5 and 1 mm, such as about 0.6 mm, for example. Herein, Pyrex glass plates 330 serve as layers 110, 120 (FIG. 1).

According to an aspect of the present invention, a small amount of cesium salt with a reducing agent, such as Al, Zr, W or alloys of these metals, may be placed in the cell (e.g., within cavity 140) prior to bonding of the top plate 330 to the silicon wafer 130. Anodic bonding of the top plate 330 to the silicon wafer 130 may occur at a temperature of about 425 C. Cesium chromate starts to emit cesium at about 500 C. As long as the softening temperature of the Pyrex is not reached, cavity 140 should remain intact. The anodic bond may itself withstand temperatures up to about 640 C, for example. Accordingly, structure 310E may be heated to between about 500 C and 640 C to generate the desired Cs atoms within cavity 140. As will be understood by those possessing an ordinary skill in the pertinent arts, the presence of non-inert gases in the cell may present difficulties, as reactive metals act as getters for oxygen, water and nitrogen. Accordingly, it may be desirable to mitigate their introduction into cavity 140.

Figure 4:
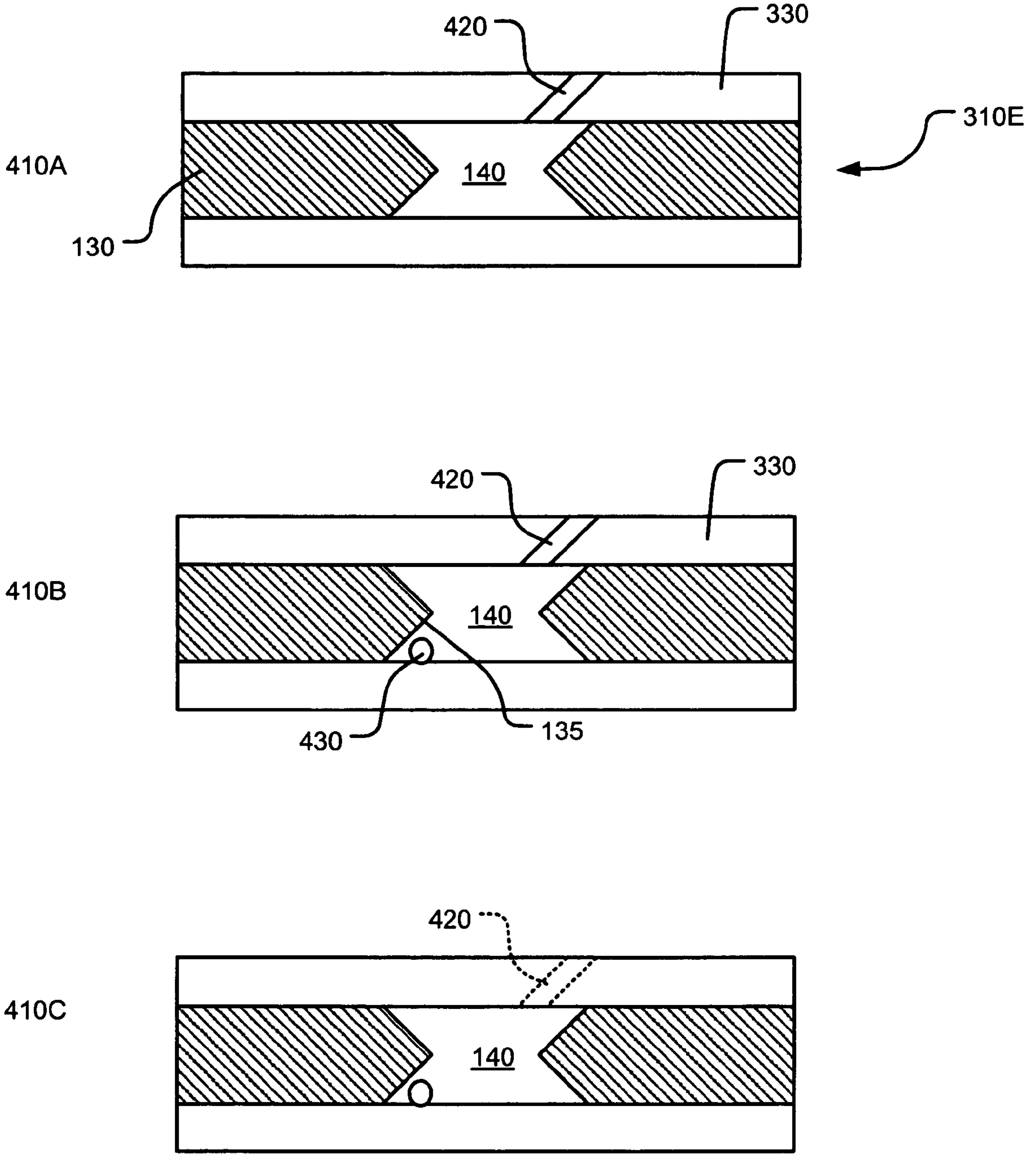
FIG. 4 illustrates a process for filling a cell according to an aspect of the present invention.

By way of non-limiting example, cavity 140 may alternatively be directly filled with an active component, e.g., Cs, and a buffer gas, such as Ar or neon. Referring now also to FIG. 4, there are shown structures 410A-410C. Structures 410A-410C represent a single structure at various processing stages. Referring first to structure 410A, there is shown the structure 310E (FIG. 3) having a small opening 420 through one of the plates 330. Opening 420 may be formed after plate 330 has been bonded to wafer 130. Opening 420 may be formed using laser drilling, for example. A $CO_2$ or excimer laser may be used to form opening 420, for example.

Opening 420 may be formed at any angle to the surface of plate 330. For example, opening 420 may be formed substantially perpendicular to plate 330. Alternatively, opening 420 may be formed at an angle other than 90° to the plane of the cell. For example, an about 100 or 125 micrometer opening at an angle of about 60° may be used, for example.

Referring still to structure 410B, opening 420 may be used to insert a syringe tip into cavity 140. The syringe may be used to deliver a Cs containing component into cavity 140. For example, Cs may be placed in a warmed syringe, and a fine needle inserted through opening 420. According to an aspect of the present invention, only a fraction of a micro liter of liquid Cs need be delivered into cavity 140. The cell may be filled with an inert gas mixture through opening 420, optionally substantially contemporaneously with the Cs transfer. For example, opening 420 may be subjected to an inert gas environment, even during Cs insertion. Back filling of cavity 140 may also be used. The inert environment may be composed of about 79% nitrogen and 21% argon, for example. The temperature of the environment may be set at a temperature corresponding to the liquid state of Cs, such as greater than about 30 C, for example. The pressure of the environment may be less than about an atmosphere, for example. Other pressures may of course be used though. For example, the pressure in the environment, and hence the finished cell, may exceed several atmospheres, such as up to about 10 atmospheres. This increased pressure may serve to enhance performance by enabling smaller cells to be used.

According to an aspect of the present invention, it may be desirable to deliver the liquid alkali metal into the cavity 140 in such a manner as not to obscure electromagnetic transmissions through the cavity (see, FIG. 2, for example). Referring now also to structure 410B, according to an aspect of the present invention a Cs droplet 430 may be delivered near a sidewall 135 of cavity 140. According to an aspect of the present invention, Cs droplet 430 may be positioned under a portion of sidewall 135 of cavity 140. According to an aspect of the present invention, such delivering and positioning may be facilitated by a sloped opening 420.

Referring now also to structure 410C, opening 420 may then be sealed, such as by using a $CO_2$ laser, for example. Optionally, opening 420 may be partially filled with a bead, fiber or crushed glass to facilitate sealing.

By way of further non-limiting example, a Cs metal may alternatively be placed in an inert gas environment analogous to the environments described hereinabove. The Cs may then be heated to obtain a measurable Cs atom stream through the opening 420 and into cavity 140. The Cs metal may be heated to around 200 C, for example. It may be desirable to maintain opening 420 at a slightly higher temperature to prevent condensation therein. Cavity 140 may be backfilled with the inert buffer gas and opening 420 sealed analogously with the foregoing discussion. As will be understood by those possessing an ordinary skill in the pertinent art, as Cs is reactive to water vapor and oxygen, it may be desirable to maintain a substantially dry, inert environment.

By way of further non-limiting example, cesium azide ($CsN_3$) may alternatively be used. $CsN_3$ melts at about 310 C and decomposes to Cs and $N_3$ at about 390 C. $CsN_3$ may be placed in cavity 140 and decomposed either before or after cavity sealing. That is, $CsN_3$ may be deposited into cavity 140 either after a single plate 330 or both plates 330 have been anodically bonded to the silicon wafer 130. Where cavity 140 is sealed after decomposition, the cell may be evacuated and backfilled with the desired buffer gas mixture, using opening 420 for example. Where cavity 140 is sealed prior to decomposition, evolved nitrogen may be incorporated into the finished cell. Optionally, internal surfaces of cavity 140 may be coated with a material like $SiO_2$, $Al_2O_3$ or $Si_xN_y$ to prevent the Cs from reacting with or diffusing into the Pyrex glass when the temperature of the cell becomes elevated, such as above about 400 C, for example.

Figure 5:
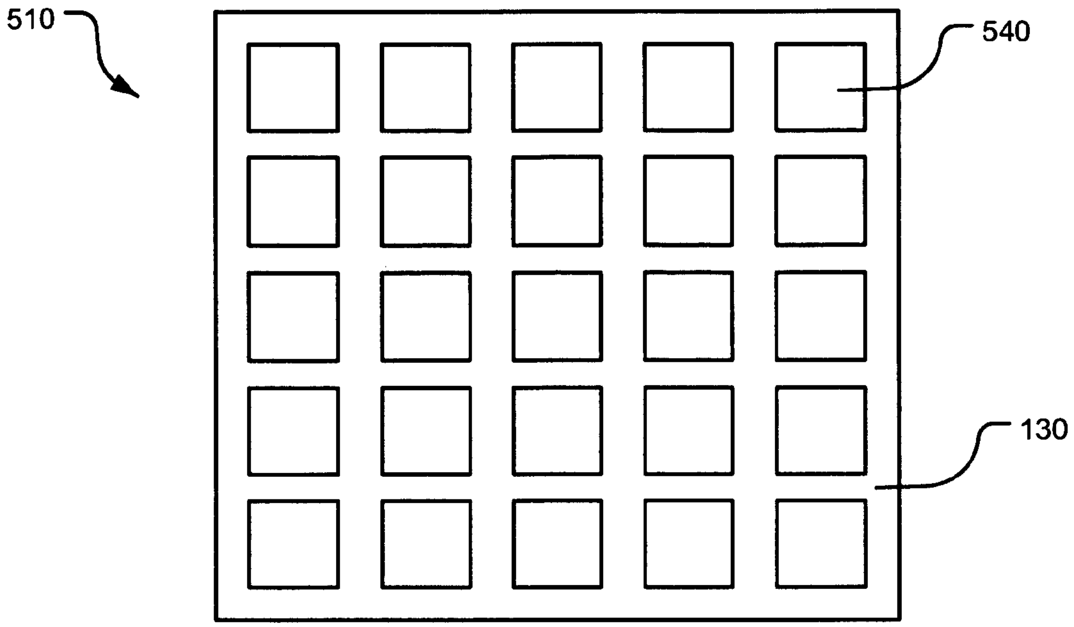
FIG. 5 illustrates an array of cells according to an aspect of the present invention.

Referring now to FIG. 5, there is shown a plan view of an array 510 of cavities 540 each corresponding to a cavity 140 (FIG. 1). After batch fabrication including cavity formation, filling and sealing analogous to that described hereinabove, array 510 may be divided using conventional separating techniques, such as dicing or cleaving, to yield a plurality of devices akin to cell 100.

Figure 6:
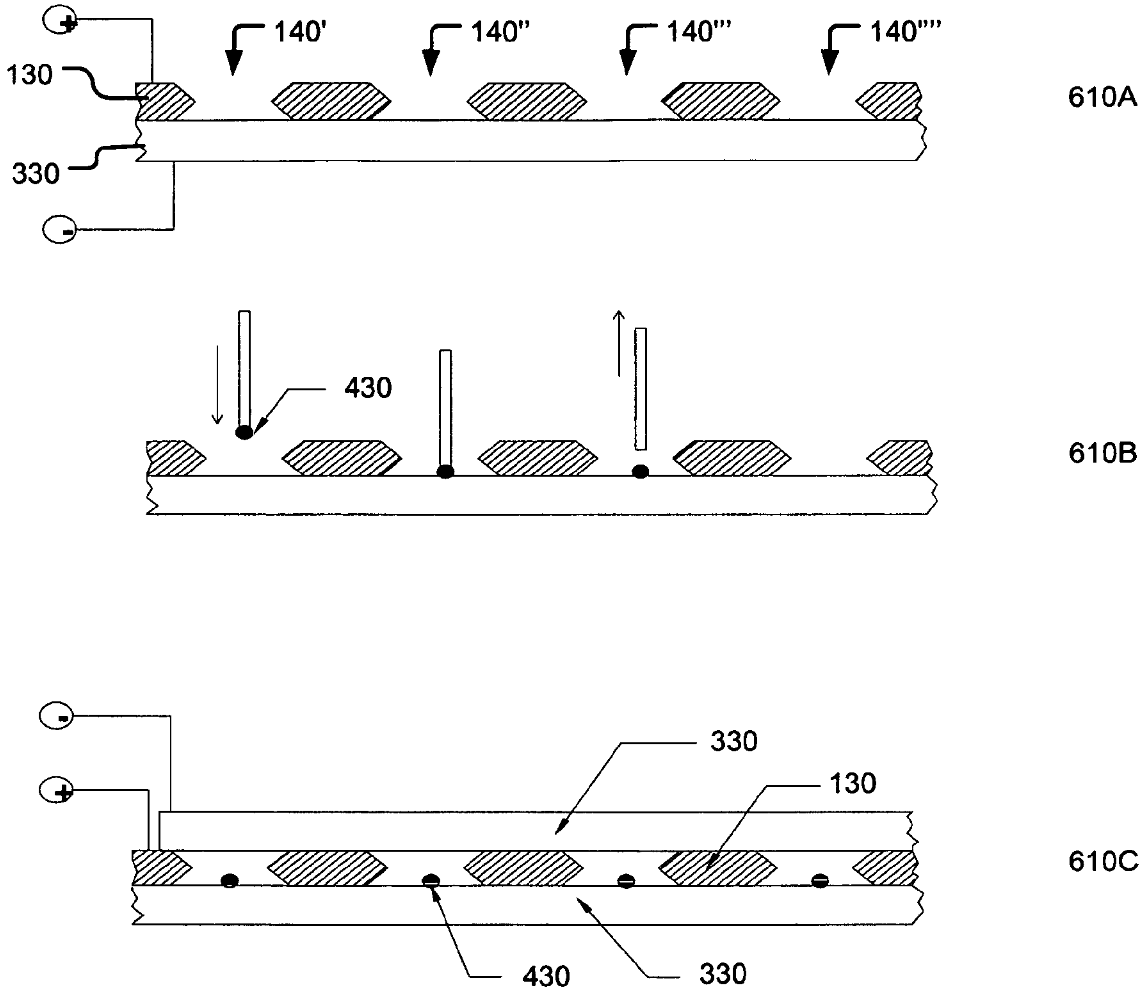
FIG. 6 illustrates a process for filling a cell according to an aspect of the present invention.

Referring now also to FIG. 6, there are shown structures 610A-610C. Structures 610A-610C illustrate a partial cross-sectional view of an array analogous to array 510 of FIG. 5, at various processing stages. Referring first to structure 610A, there is shown patterned silicon layer 130 bonded to a single plate 330. Layer 130 may be positively charged with respect to plate 330 to facilitate anodic bonding. Layer 130 may be processed according to the teachings hereof, to yield a plurality of cavity openings 140'-140"". For example, silicon wafer 130 may be patterned by chemical etching, and anodically bonded to a 0.6 mm thick Pyrex 7740 plate at a temperature of greater than about 300 C. Structure 610A may be placed in an inert, buffer gas environment suitable for use within the cavities.

Referring now also to structure 610B, a liquid alkali metal pin transfer to each cell cavity at a temperature greater than the melting point of the alkali metal (Cs is about 30 C) and within a buffer gas environment may be effected. Optionally, a liquid Cs metal pin transfer at a temperature of about 100 C within a buffer gas environment, e.g., a buffer gas containing enclosure, may be effected. This may serve to facilitate more rapid anodic bonding of the sealing plates after Cs insertion by, in effect, pre-heating the silicon wafer 130. Either way, a fine tungsten-carbide drill bit may prove well suited to effect pin transfer, where the flutes may facilitate liquid Cs transfer. Optionally, an array of pins may be used to substantially simultaneously deliver the alkali metal to a plurality of cavities, e.g., 140', 140", 140'" and 140"" (FIG. 5).

According to an aspect of the present invention, each cell cavity may be coated with a protectant, such as $SiO_2$, $Al_2O_3$ or $Si_xN_y$ prior to Cs pin transfer or the second plate 330 being bonded to the silicon wafer 130. This may be accomplished using conventional plasma enhanced chemical vapor deposition, for example. This may serve to provide a layer about 1000 angstroms thick of protectant material over at least a part of the exposed portions of the interior of cavity 140 and a top, exposed surface of wafer 130. The coated, top surface of wafer 130 may be polished to remove corresponding portion(s) of the protectant. The protectant remaining within the cell cavity 140 may serve to prevent wicking of the liquid Cs up the sidewalls of cavity 140 during subsequent anodic bonding, for example.

Referring now also to structure 610C, the silicon wafer 130 may be anodically bonded to the other plate 330, thereby sealing the array of cells in the inert atmosphere, at around 300 C. The cells may then be diced or cleaved apart to provide individual devices, for example.

Figure 7:
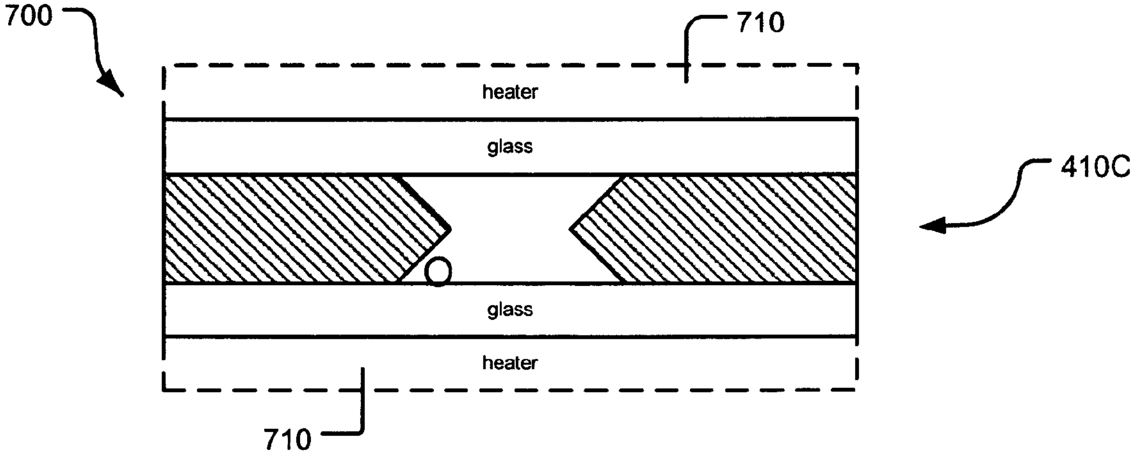
FIG. 7 illustrates a cell according to an aspect of the present invention.

Referring now also to FIG. 7, there is shown a structure 700 according to an aspect of the present invention. Structure 700 is akin to structure 410C, and may be formed using the processing discussed with regard thereto and with regard to FIG. 6, for example. Structure 700 further includes one or more optional heater(s) 710. Heaters 710 may be used to elevate the cavity 140 to operating temperatures, such as temperatures around 100 C, for example.

Each heater 710 may take the form of a patterned indium tin oxide structure. Each heater layer 710 may have an operating range of about 110±30 C, for example. Heater(s) 710 may be selectively activated, using attached leads (not shown) for example. By selectively activating heaters 710, the temperature of cavity 140, and hence the Cs within cavity 140, may be elevated. By heating the Cs, more or less Cs may be converted into a gaseous, free flowing state, as a function of cell temperature and pressure, for example. This may prove advantageous during operation of a device including the cell, where the Cs may otherwise condense or otherwise obstruct transmissions through the cell.

According to an aspect of the present invention, each ITO heater 710 may be lithographically patterned to provide for different heating effects in different regions of cavity 140. By selectively heating different portions of cavity 140 differently, liquid cesium in cavity 140 may be accumulated near one side or a periphery, where it is less likely to undesirably obstruct transmissions through the cavity.

Figure 8A:
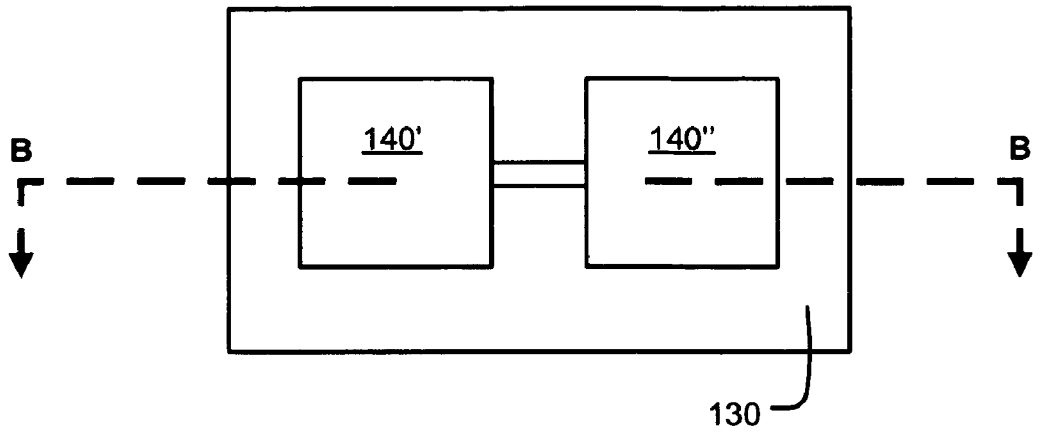
FIGS. 8A and 8B illustrate a cell according to an aspect of the present invention.
Figure 8B:
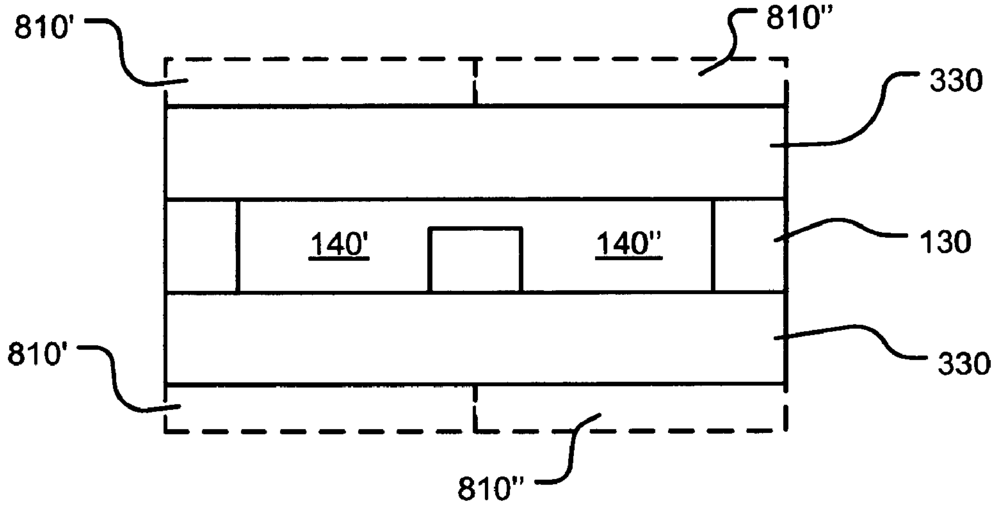

According to an aspect of the present invention, multiple cavities may be coupled together. Referring now also to FIG. 8A, there are shown cavities 140' and 140" formed in a common silicon wafer 130. FIG. 8B illustrates cross-section B-B of FIG. 8A. According to an aspect of the present invention, one or more ITO heaters 810' and 810", akin to heaters 710, may be provided. ITO heaters 810' may be selectively operable. ITO heaters 810" may be selectively operable. Accordingly, the temperature of cavity 140' may be varied with respect to cavity 140", and vice-a-versa. By selectively heating the cavities 140', 140" differently, liquid cesium in cavities 140', 140" may be accumulated in a desired one of the cavities, where it is less likely to undesirably obstruct transmissions through the other cavity. One or more of heaters 810', 810" may be used to elevate one or more of the cavities 140', 140" to operating temperature as well.

Figure 9:
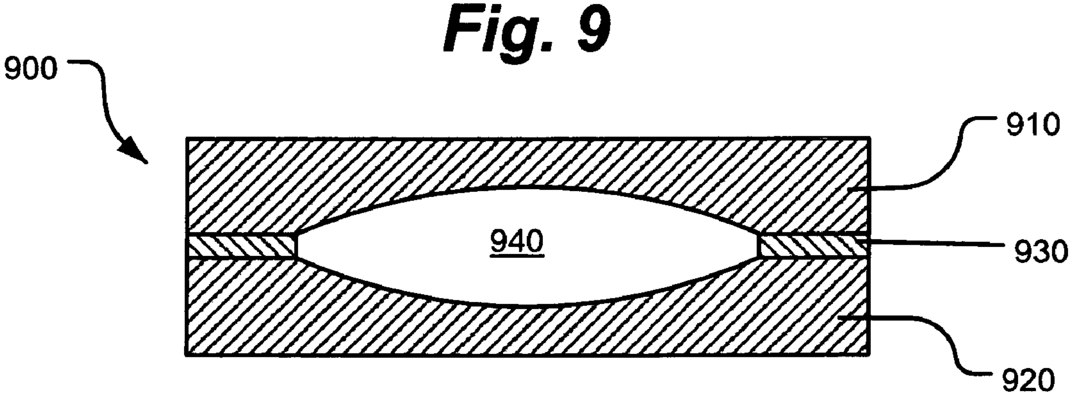
FIG. 9 illustrates a cell according to an aspect of the present invention.

Referring now also to FIG. 9, there is shown a cavity structure 900 according to an aspect of the present invention. Structure 900 generally includes layers 910, 920 and 930 forming closed cavity 940. By way of non-limiting example, layers 910, 920 may take the form of an amorphous silicate, such as the aforementioned borosilicate glass (Pyrex). Layer 930 may take the form of single crystal silicon, also by way of non-limiting example only. Like cavity 140, cavity 940 may contain metallic cesium, or other alkali metal, and a buffer gas, such as an inert buffer gas like argon or neon.

By way of non-limiting example, cell 900 may also be suitable for use with the method and system described in U.S. Patent Publication No. 2004/0233003A1, entitled METHOD AND SYSTEM FOR OPERATING AN ATOMIC CLOCK WITH REDUCED SPIN-EXCHANGE BROADENING OF ATOMIC CLOCK RESONANCES, by William Happer and Daniel Walter.

Figure 10:
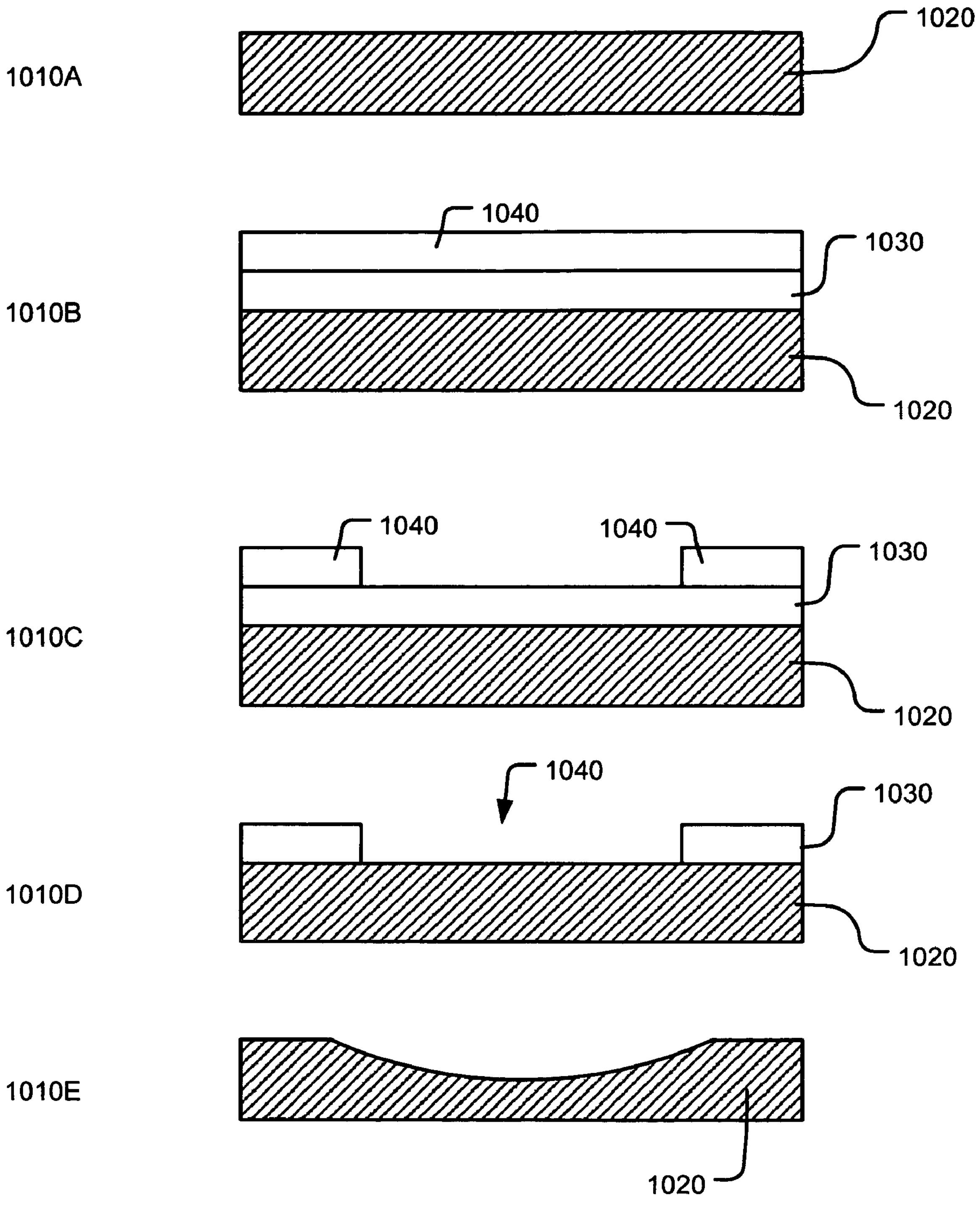
FIG. 10 illustrates a process for fabricating a cell component according to an aspect of the present invention.

Referring now also to FIG. 10, there are shown structures 1010A-1010E. Structures 100A-1010E represent a single structure at various processing stages. Structure 1010E is analogous to each of layers 910 and 920. Referring first to structure 1010A, there is shown a layer 1020. Layer 1020 may take the form of a borosilicate glass, akin to layers 110, 120 of FIG. 1. Referring now also to structure 1010B, layer 1030 may be provided on glass 1020. Layer 1030 may be composed of a layer of gold on chrome, for example. Layer 1030 may serve as a patterning mask for glass 1020. Layer 1030 may be sputtered onto glass 1020, for example. A photoresist layer 1040 may be provided over layer 1030. Layer 1040 may take the form of dry film photoresist, such as Riston, which is commercially available from DuPont. Layer 1040 may be patterned using conventional photolithographic processing to provide an opening 1040', as is shown in structure 1010C. The size of opening 1040' may determine the eventual length and width of cavity 940 (FIG. 9). The shape of opening 1040' may determine the eventual shape of cavity 940 (FIG. 9). Portion(s) of layers 1030 may then be removed using the remaining portions of layer 1040 as a patterning mask, as is shown in structure 1010D. A conventional $CF_4$ plasma etch may be used to remove the unmasked portions of layers 1030, for example.

Referring now also to structure 1010E, the remaining portions of layer 1030 may serve as an anisotropic etch mask for glass 1020. A buffered oxide etch, such as one using HF, may be used to form recess(es) in glass 1020. The depth and shape of the recess(es) determines the eventual depth and shape of cavity 940. Other techniques may optionally be used in lieu of an etch, such as physical machining or eroding. Layers 1030/1040 may be selected to complement the method used to selectively thin glass 1020, and possibly even omitted where unnecessary. Optionally, a silicon layer may be deposited prior to providing layers 1030/1040, such that the recess and surrounding silicon may be substantially simultaneously formed. Regardless, structure 1010E corresponds to each of layers 910, 920.

Figure 11:
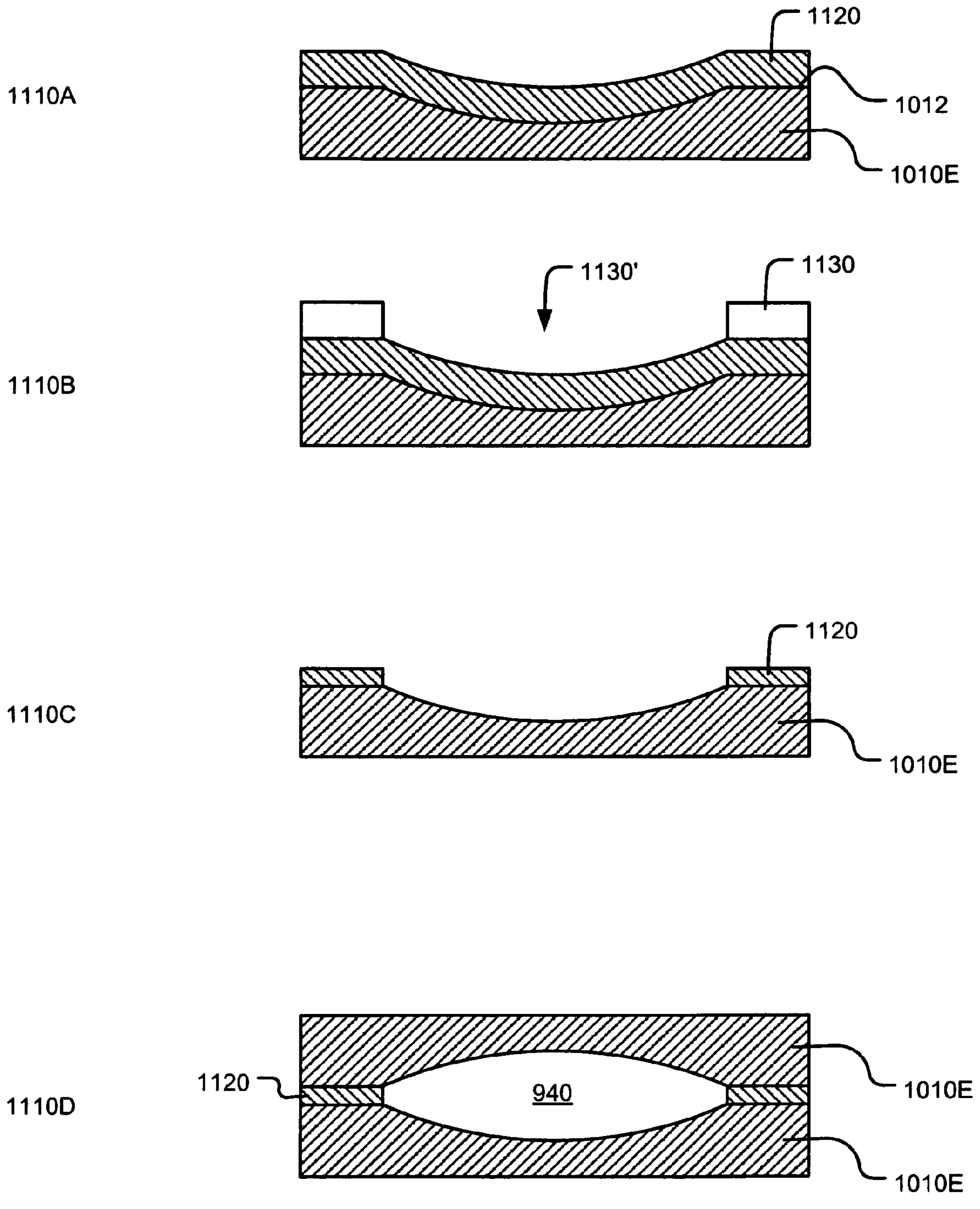
FIG. 11 illustrates a process for fabricating a cell using the component of FIG. 10 according to an aspect of the present invention.

Referring now also to FIG. 11, if not already provided, a single structure 1010E may be coated with a layer of silicon to facilitate anodic bonding to another structure 1010E to form cell 900. FIG. 11 illustrates structures 1110A-1010D. Structures 1110A-1010D represent a single structure at various processing stages.

Referring first to structure 1110A, an about 5000 angstrom thick layer 1120 of silicon may be formed on an upper surface 1012 of a structure 1010E using plasma enhanced chemical vapor deposition, for example. Referring now also to structure 1110B, a photoresist layer 1130 may be provided over layer 1120. Layer 1130 may take the form of dry film photoresist, such as Riston, which is commercially available from DuPont. Layer 1130 may be patterned using conventional photolithographic processing to provide an opening 1130'. The size of opening 1130' may correspond to the length and width of the recess in structure 1010E. Portions of silicon layer 1120 may then be selectively removed using the remaining portions of layer 1130 as an etching mask. Conventional $CF_4$ plasma etching may be used to selectively remove the portions of silicon layer 1120 corresponding to the recess(es) in structure 1010E. The remaining portions of mask 1130 may then be removed, as is shown in structure 1110C.

Referring now to structure 1110D, a second structure 1010E may then be anodically bonded to silicon layer 1120 to provide cell 900. Cell 900 may be Cs and inert gas loaded consistently with any of the methodologies discussed herein with regard to FIGS. 1-8.

Figure 12:
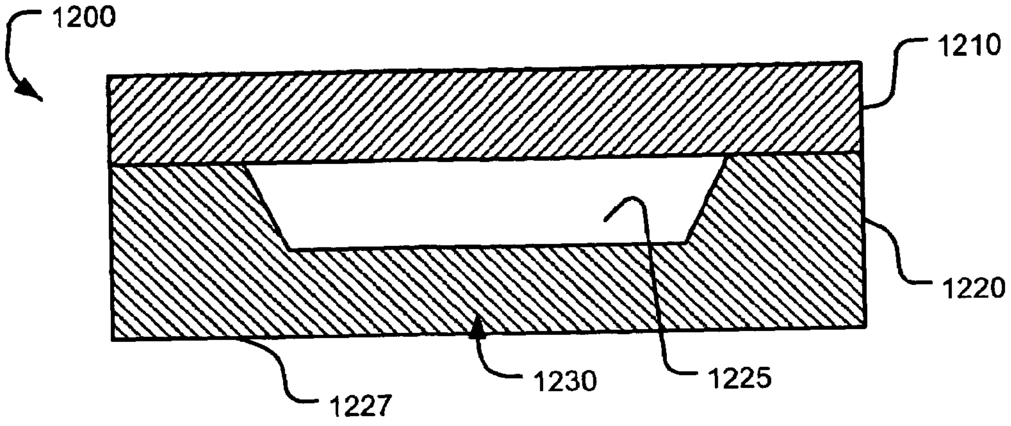
FIG. 12 illustrates a cell according to an aspect of the present invention.

Referring now also to FIG. 12, there is shown a structure 1200 according to an aspect of the present invention. Structure 1200 generally includes a borosilicate glass layer 1210 and a silicon component 1220. Layer 1210 is akin to layer 110 of FIG. 1. Component 1220 may take the form of a single crystal silicon wafer. Wafer 1220 may have a recess 1225 formed therein, using any of wafer processing methods described herein, for example. Recess 1225 may then have an alkali metal provided therein, again using any of the methods described herein, for example. Layer 1210 may then be bonded to wafer 1220 to seal the recess and form a cavity containing the provided alkali metal, such as by using anodic bonding as has been discussed herein.

As will be evident to one possessing an ordinary skill in the pertinent arts, one difference between structure 1200 of FIG. 12 and structure 100 of FIG. 1 is that recess 1225 has not been carried completely through wafer 1220. Instead, portion 1230 of wafer 1220 remains between recess 1225 and an oppositely disposed surface 1227. Portion 1230 may be processed using conventional semiconductor processing techniques to provide a detector thereon, or therein. For example, portion 1230 may be processed to provide a photo-detector thereon or therein.

By way of non-limiting example, cell 1200 may also be suitable for use with the method and system described in U.S.

Patent Publication No. 2004/0233003A1, entitled METHOD AND SYSTEM FOR OPERATING AN ATOMIC CLOCK WITH REDUCED SPIN-EXCHANGE BROADENING OF ATOMIC CLOCK RESONANCES, by William Happer and Daniel Walter.

Figure 13:
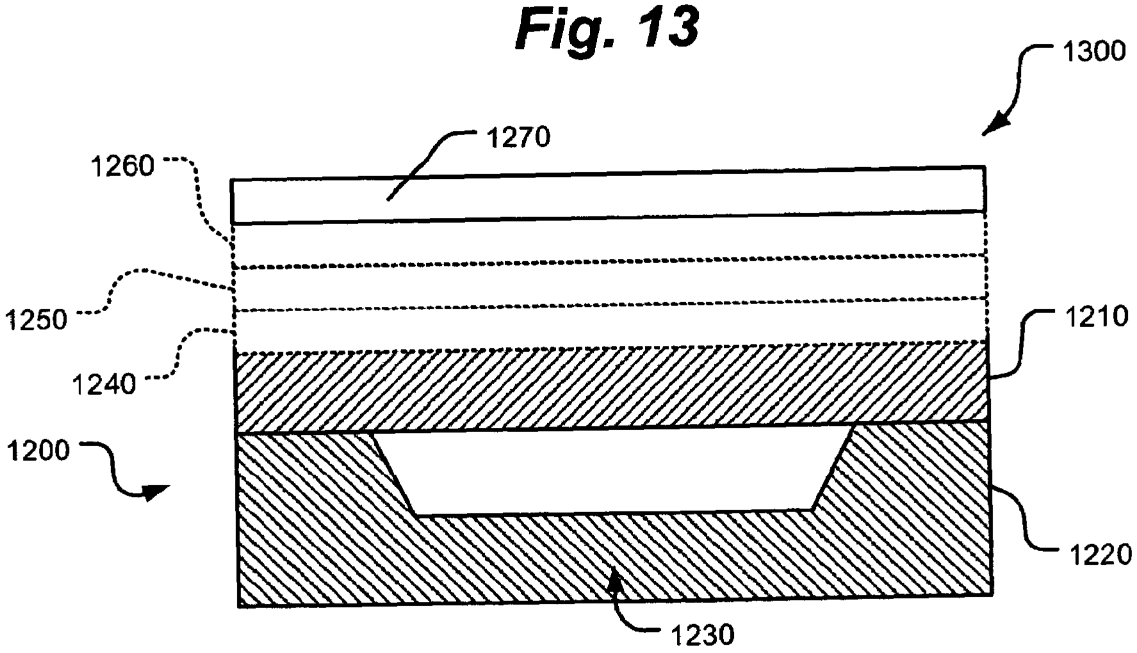
FIG. 13 illustrates a device incorporating the cell of FIG. 12 according to an aspect of the present invention; and, FIG. 14 illustrates a system according to an aspect of the present invention.

Referring now also to FIG. 13, there is shown a system 1300 incorporating structure 1200 of FIG. 12. Additionally, system 1300 includes a source 1270, akin to VCSEL of source 220 (FIG. 2) for example. Optionally, system 1300 may include a neutral density filter 1260, modulator 1250 and/or ¼ waveplate 1240, that may be akin to filter 230, modulator 250 and ¼ waveplate 240 of system 200 (FIG. 2), for example.

Thus, according to an aspect of the present invention, there is provided a method for fabricating cells well suited for use in Chip-Scale Atomic Clocks (CSACs), though such a cell may have other uses as well, such as in atomic clocks of other sizes. By way of non-limiting example only, a "Chip-Scale Atomic Clock" may take the form of an atomic clock being roughly 1 $cm^3$ or smaller. Such a clock may have a power dissipation of about 30 mW or less. Such a clock may be fabricate-able using batch fabrication techniques akin to those commonly used in microelectronics. Nonetheless, such a clock would permit for a higher concurrency in space and time than is generally available today. Such concurrency is believed to be particularly useful for distributed processing and system implementation, such as that using a distributed computation system, by way of non-limiting example only.

By way of further, non-limiting example only, a distributed computation system generally includes a plurality of processors and associated computational hardware such as memory units, all connected by data links. Examples of such computation systems include so-called "grid computing" in which asynchronous data links between multiple processor units, which may consist of conventional microprocessor based computers, permit the computation of certain classes of complex numerical problems, such as finite difference time domain simulations of electromagnetic fields, by way of non-limiting example. Other examples include classic supercomputer clusters in which processors are situated in close proximity to one another. Such supercomputer clusters are capable of computing solutions to numerical problems such as those requiring so-called vector processing. Such problems are of a class of difficulty greater than those generally handled by the aforementioned grid computers because they require choreographed synchrony between computations carried out in the multiplicity of processors with data exchange between these processors the limiting factor.

For this reason, supercomputer architectures have conventionally been devised which provide short data latency between processors. A limitation to the complexity of problems, and the usefulness of the solutions to numerical problems calculated by such distributed processors, is the physical limitation associated with concentrating multiple processors in close proximity. This physical limitation is brought about by size limitations, and more fundamentally by heat dissipation limitations, associated with the concentration of multiple processors, memories, and data links in a local cluster such as a supercomputer which may be situated in a volume of a few cubic meters or less.

According to an aspect of the present invention, an alternative or complementary approach to physical concentration of computational hardware in a local cluster may be achieved. According to an aspect of the present invention, a distributed synchronous computer may be devised in which a time standard is employed to maintain synchrony between multiple remote processors and their data links. An atomic clock, using a cell according to an aspect of the present invention, may be particularly well suited for providing a local time reference to a processor such that the precise time of word-by-word instructional computation in a digital processor may be synchronized between multiple remote processors. Additionally, the exact timing of the bit streams transmitted over data links may permit the data links themselves to be considered as elements of the entire distributed processor, acting as non-random-access memory elements. For example, a path delay of 1 msec may be considered a 106 bit memory in a 1 GHz data rate channel. The realization of chip-scale atomic clocks may thus permit the deployment of local time standards across the network, with one for each processor. The timing accuracy of atomic clocks is such that an Allen deviation of ca. $10^{-11}$ may be achieved over a one-hour duration. The significance of this level of Allen deviation is that, after one hour (i.e., 3600 seconds), the error in bit timing, or jitter, may be around 36 nanoseconds, permitting data communications at 10 Mb/s rates per channel over a computation lasting one hour. Such computations may take the form of vector computations, i.e., of a class of problems that cannot be handled by grid computing networks as described above. Examples of vector computing problems include weather prediction, geophysical exploration for energy resources, the dynamics of nuclear fusion reactors, and complex fluid and chemical problems such as those describing biological processes and biochemical reactions such as those enabling drug pathways, all by way of non-limiting example only.

Figure 14:
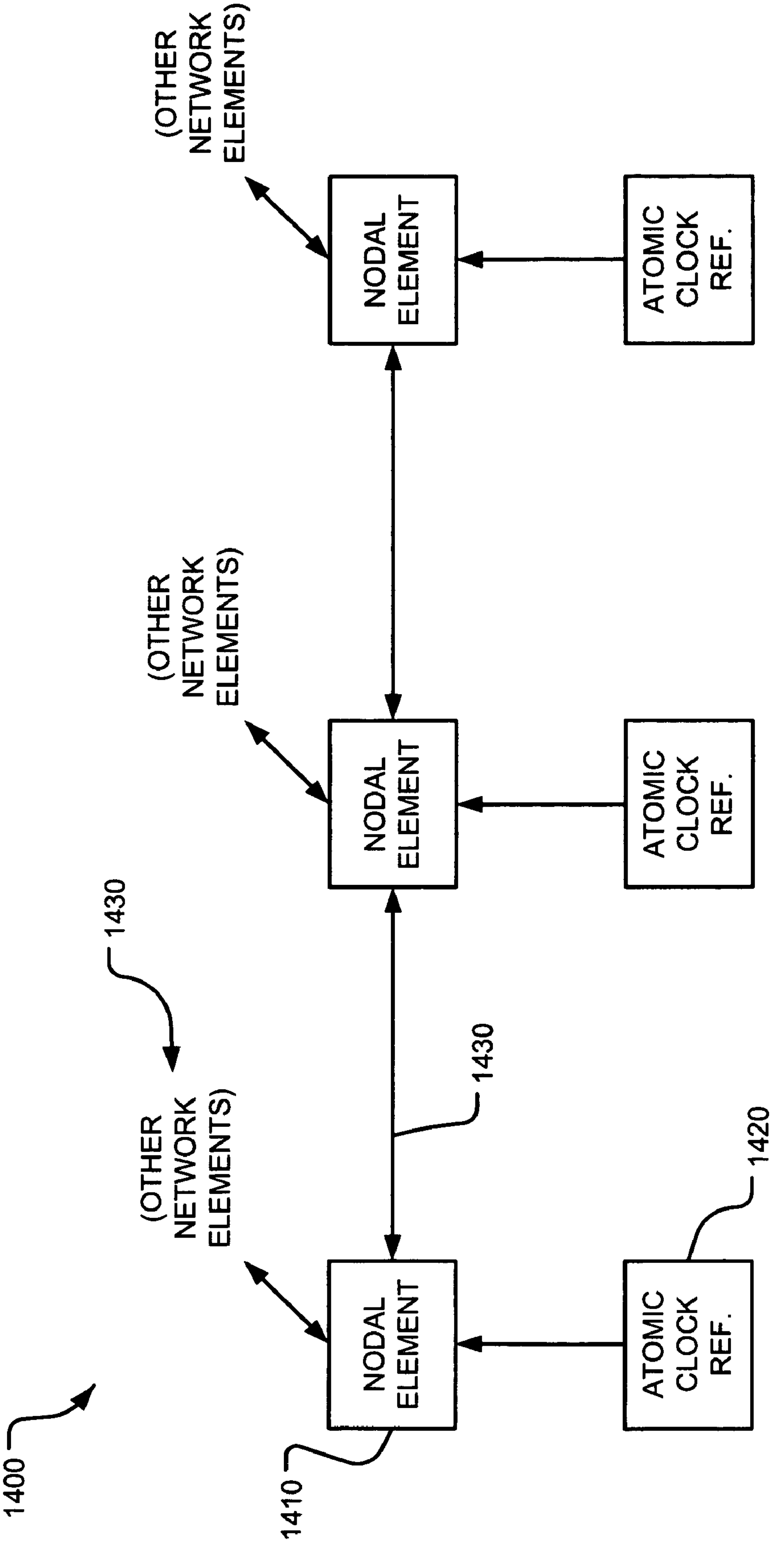

Referring now to FIG. 14, there is shown a distributed computation system 1400 according to an aspect of the present invention. System 1400 generally includes a plurality of digital data processing nodal elements 1410 connected by communications links 1430, such as extended data links. Each computational nodal element 1410 may include one or more processors that operate dependently upon a local atomic clock time reference signal originating from a local atomic clock 1420, such as a chip-scale atomic clock incorporating a cavity according to an aspect of the present invention.

Further yet, multiple data channels per "processor pair" may be achieved according to an aspect of the present invention, such that data rates can be increased for the given 1-hour example to Gb/s or higher. For example, 50 wave division multiplexed (WDM) channels each operating at 20 Mb/s is a 1 Gb/s data link. Higher data link rates can similarly be provided through WDM, frequency division multiplexing (FDM) and/or other multiplexing techniques that does not reduce the bit period below the synchrony rate, exemplified here as 36 nanoseconds.

Atomic clocks according to one or more aspects of the present invention may also be well suited for facilitating use of time-ordered encryption keys with portable and lightweight secure communications gear (i.e., transceivers) and rapid Global Positioning System (GPS) signal acquisition gear (i.e., receivers), by way of further non-limiting example only. Regardless, such a clock will have broad applicability and usefulness. The cell may of course have other uses as well, such as for use with magnetometers, gyroscopy and other physical instrumentation.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A cell suitable for use with an atomic clock comprising:

a silicon wafer having a recess formed therein, wherein the recess is enclosed by three sides of said silicon wafer;

an alkali metal containing component and buffer gas in said recess; and, at least one amorphous silicate member having an ion mobility and temperature expansion coefficient approximately that of silicon and closing said recess; wherein an optical signal travels from said at least one amorphous silicate member to the recess without traveling through said silicon wafer.

2. The cell of claim 1, wherein said at least one amorphous silicate member comprises borosilicate glass.

3. The cell of claim 1, wherein said alkali metal component comprises a Cs vapor.

4. The cell of claim 3, wherein said buffer gas comprises at least one of argon, neon and nitrogen.

5. The cell of claim 1, further comprising at least one heater positioned substantially adjacent to said at least one amorphous silicate member.

6. The cell of claim 5, wherein said heater comprises a patterned indium tin oxide heater.

7. The cell of claim 1, further comprising a photo detector being integrated with said silicon wafer.

8. The cell of claim 1, further comprising a laser suitable for emitting optical energy having a center wavelength of 894 nm into said recess.

9. The cell of claim 8, further comprising at least one wave plate between said laser and said alkali metal containing component.

10. The cell of claim 8, further comprising an amplitude modulator positioned between said laser and said alkali metal containing component.

11. The cell of claim 8, further comprising a neutral density filter positioned between said laser and said alkali metal containing component.

12. The cell of claim 8, further comprising a reflector positioned with respect to said cavity to reflect emissions from said laser back through said cavity.

13. A cell suitable for use with an atomic clock comprising:

a first amorphous silicate member having an ion mobility and temperature expansion coefficient approximately that of silicon;

a silicon containing layer over said first amorphous silicate member, wherein said silicon containing layer having a recess formed therein;

an alkali containing component and buffer gas in said recess; and a second amorphous silicate member having an ion mobility and temperature expansion coefficient approximately that of silicon and being anodically bonded to said silicon containing layer and closing said recess; wherein an optical signal travels between said first amorphous silicate member and said second amorphous silicate member via the recess without traveling through said silicon containing layer.

14. The cell of claim 13, wherein said alkali metal component comprises a Cs vapor and said buffer gas comprises at least one of argon, neon and nitrogen.

15. The cell of claim 13, further comprising at least one heater positioned substantially adjacent to at least one of said borosilicate glass members.

16. The cell of claim 13, further comprising at least one of $SiO_2$ and $Al_2O_3$ coating at least a portion of an interior surface of said recess.

17. A system comprising:

a clock comprising a silicon wafer having a recess formed therein, wherein the recess is enclosed on three sides by said silicon wafer; at least one amorphous silicate member having an ion mobility and temperature expansion coefficient approximately that of silicon and closing said recess; and, an alkali metal containing component and buffer gas contained in said recess, wherein an optical signal travels from said at least one amorphous silicate member to the recess without traveling through said silicon wafer; and, a device having an input coupled to said clock and being operatively responsive to said input.

18. The system of claim 17, wherein said device comprises at least one of a distributed computing system nodal computing element, a global positioning system signal receiver and a communications transceiver.

19. A system comprising:

a clock comprising a first amorphous silicate member having an ion mobility and temperature expansion coefficient approximately that of silicon; a silicon containing layer over said first amorphous silicate member, wherein said silicon containing layer having a recess formed therein; an alkali containing component and buffer gas in said recess; and, a second amorphous silicate member having an ion mobility and temperature expansion coefficient approximately that of silicon anodically bonded to said silicon containing layer and closing said recess, wherein an optical signal travels between said first amorphous silicate member and said second amorphous silicate member via the recess without traveling through said silicon containing layer; and, a device having an input coupled to said clock and being operatively responsive to said input.

20. The system of claim 19, wherein said device comprises at least one of a distributed computing system nodal computing element, a global positioning system signal receiver and a communications transceiver.

* * * * *

UNITED STATES PATENT AND TRADEMARK OFFICE

CERTIFICATE OF CORRECTION

PATENT NO. : 7,400,207 B2
APPLICATION NO. : 11/030009
DATED : July 15, 2008
INVENTOR(S) : Lipp et al.

It is certified that error appears in the above-identified patent and that said Letters Patent is hereby corrected as shown below:

Title page item (75), change “Sterling Eduard McBride” to --Sterling Eduardo McBride--

Signed and Sealed this

Twenty-third Day of September, 2008

JON W. DUDAS
*Director of the United States Patent and Trademark Office*